United States Patent [19]

Kudryk et al.

[11] 4,336,237
[45] Jun. 22, 1982

[54] REMOVAL OF MERCURY FROM SULFURIC ACID

[75] Inventors: Val Kudryk, Closter; Martin Goffman, Edison, both of N.J.

[73] Assignee: Asarco Incorporated, New York, N.Y.

[21] Appl. No.: 202,999

[22] Filed: Nov. 3, 1980

[51] Int. Cl.³ .................. C01B 17/90; B01D 23/10
[52] U.S. Cl. .................. 423/531; 423/100; 210/688
[58] Field of Search ........... 423/522, 531, 527, 100, 423/101, 103, 491; 210/288, 688

[56] References Cited

U.S. PATENT DOCUMENTS

| | | | |
|---|---|---|---|
| 3,689,217 | 9/1972 | Capaul | 423/531 |
| 3,873,581 | 3/1975 | Fitzpatrick et al. | 423/531 |
| 3,875,287 | 4/1975 | Kurikami | 423/531 |
| 3,899,570 | 8/1975 | Chapman et al. | 423/100 |
| 4,151,077 | 4/1979 | Nogueira et al. | 423/100 |

FOREIGN PATENT DOCUMENTS 52-53793  4/1977  Japan .................. 423/531

Primary Examiner—Gary P. Straub
Attorney, Agent, or Firm—Kenneth A. Koch; Daniel R. Zirker

[57] ABSTRACT

A method for removing mercury from a sulfuric acid solution including the steps of mixing the sulfuric acid solution with a hydrocarbon solution to form a chemical complex containing mercury. The hydrocarbon solution typically contains a lower alcohol and a halogen component. The mercury complex is removed by the addition of activated carbon and subsequent filtration. Alternatively, solvent extraction, volatilization or other suitable separation techniques can be used.

16 Claims, 2 Drawing Figures

REMOVAL OF MERCURY FROM SULFURIC ACID

BACKGROUND OF THE INVENTION

The present invention relates to the removal of mercury (Hg) from sulfuric acid ($H_2SO_4$) solutions. More specifically, the invention provides a method that is not temperature or concentration dependent for removing both metallic and ionic mercury from commercially produced sulfuric acid.

The commercial production of sulfuric acid from sulfur dioxide ($SO_2$) bearing gases inherently results in trace amounts of mercury, i.e. from about 2 to about 20 parts per million, being present in the final acid solution. Typically, the $SO_2$ bearing gas is supplied to the acid plant from a roaster or smelter which burns off the sulfidic content of metallic ores and concentrates. Metallic ores and concentrates, for example those of lead, zinc and copper, naturally contain trace amounts of mercury in the form of HgS which decomposes during the roasting operation, liberating mercury which is vaporized and carried over to the acid plant with the $SO_2$ bearing feed gas. Typically, 40% to 50% of the mercury carried over to the acid plant in the $SO_2$ bearing gas from the roaster is found in the acid product.

For many years the presence of trace amounts of Hg in sulfuric acid has not been considered a problem. However, future governmental regulations may specify an allowable level of Hg in sulfuric acid that is below the amount now common in untreated acid. Typically, the Hg content of $H_2SO_4$ produced from metallurgical $SO_2$ bearing gas is from about 2 parts per million (ppm) to about 20 ppm. It is desirable to reduce the Hg content of such $H_2SO_4$ solutions to less than 1 ppm, hereinafter sometimes referred to as a low Hg content or level.

Accordingly, the present invention provides a method for the substantial reduction of typical Hg levels in $H_2SO_4$ produced from $SO_2$ bearing gases from metallurgical processes, such as roasting and sintering sulfidic ores, to low levels of Hg. The new method is economical to use, does not require a large capital investment and is not temperature or concentration dependent.

It is known in the art to produce $H_2SO_4$ having a low Hg content by either removing the Hg from the $SO_2$ feed gas prior to the acid plant or from the product acid or from both. A printed publication entitled "Mercury Control For Sulfuric Acid Manufacture" from the book "World Mining and Metals Technology" describes commercially used methods for removing Hg from the $SO_2$ bearing gas and from the product acid, either independently or in combination, depending upon the starting material and the desired results.

The removal of Hg from metallurgical gas, as described in the aforementioned publication, provides for the injection of modest amounts of $H_2S$ at selected point in the gas purification system. The Hg vapor is converted to HgS which is removed from the gas stream by coke filters. Periodically, the mercury-laden coke is removed from the filters and treated for mercury recovery. This process is also described in U.S. Pat. No. 3,855,387.

The aforementioned publication also describes, and U.S. Pat. No. 3,875,287 discloses a process for reducing the Hg content of sulfuric acid to desired low levels, i.e. about 0.5 ppm, by adding potassium and other iodides in powder form to the acid to form nascent iodine that reacts with Hg to produce mercury iodide. The mercury iodide is insoluble in the acid and precipitates out. This process is temperature and concentration sensitive in that the formation of $HgI_2$ does not take place at commercially feasible rates at temperatures higher than about 30° C. or with acid concentrations lower than about 70% by weight.

The removal of mercury contained in sulfuric acid as a sulfide precipitate is taught in German Pat. No. 1,054,972. As disclosed in German Pat. No. 1,216,263, elemental sulfur is also known as a precipitating agent to remove mercury from sulfuric acid.

SUMMARY OF THE INVENTION

All percentages referred to hereinafter are by weight unless otherwise specified.

The invention provides a method for removing trace amounts of mercury from a sulfuric acid solution which comprises the steps of preparing a solution of a halogen or halogen containing compound and a suitable liquid hydrocarbon, adding the hydrocarbon solution to the sulfuric acid solution, forming a chemical complex including mercury, and removing the complex from the acid solution. As used hereinafter, the term mercury complex shall mean the chemical complex formed by mixing the halogen containing hydrocarbon solution with a mercury containing acid solution. Although the inventors do not intend to be bound to any specific structure, it is believed that the mercury complex includes in addition to mercury at least one of the halogen and hydrocarbon fractions supplied to the acid. Most likely the hydrocarbon component promotes the formation of a mercury-halogen complex that is readily removable from the acid as will be described in more detail hereinafter.

The method of the invention is not temperature dependent within the normal temperatures encountered in sulfuric acid production and is effective at temperatures from about 0° C. to about 150° C. A further advantage of the new process is that it is not concentration dependent and is effective when used on sulfuric acid solutions having a concentration of from almost 20% to about 100% acid, which, of course, includes the most common 93% and 98% commercial acid.

According to the invention, the amount of elemental halogen supplied should be in an atomic ratio to the mercury present of at least 1:1 and preferably 2:1 to 6:1. The hydrocarbon liquid should be soluble in the sulfuric acid, and may be a ketone, ester, ether, organic acid, aldehyde, alcohol or other suitable organic liquid. Preferably, the organic liquid is a compound containing from 1 to 8 carbon atoms and either one or two oxygen atoms. Most preferably, the hydrocarbon liquid is a lower alcohol, i.e. monohydric alcohol having a chain of from 1 to 3 carbon atoms.

In accordance with a further aspect of the invention, the mercury complex formed in the acid solution is readily removed by adding activated carbon powder to the solution, dispersing the activated carbon and removing it by filtration. The mercury complex is adsorbed by the activated carbon particles and is removed with the activated carbon, leaving the purified acid solution.

Alternatively, the acid solution can be mixed with an appropriate organic solvent such as chloroform, methyl ethyl ketone, trichloroethane or trichloroethylene to transfer the mercury complex to the solvent. When settled, the solvent forms an upper layer insoluble in the acid. The purified acid can then be drawn off and the complex removed from the solvent layer by adsorbtion on activated carbon and filtration.

It is believed that the mercury complex is adsorbed by the activated carbon. Measurements of the mercury content of the acid solution after removal of the activated carbon shows that substantially all of the mercury has been removed leaving only trace amounts, i.e. in the order of less than about 1 ppm. The formation by the method of the invention of a mercury complex that is readily adsorbable on activated carbon powder was entirely unexpected. The mercury complex may be removable from the acid solution by other suitable methods such as volatilization.

BRIEF DESCRIPTION OF THE DRAWING

The invention will be further described with reference to the drawing in which.

DETAILED DESCRIPTION

Figure 1:
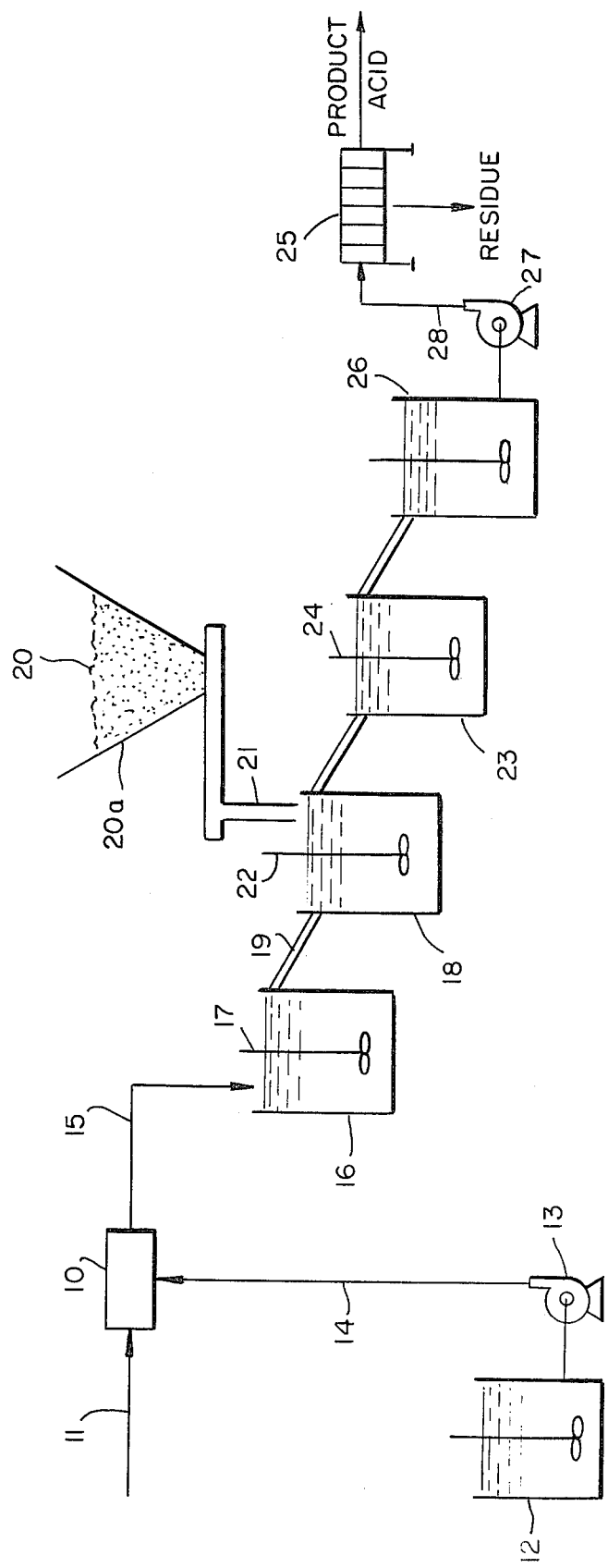
FIGS. 1 and 2 are schematic views of alternate methods and apparatus for practicing the method of the invention.
Figure 2:
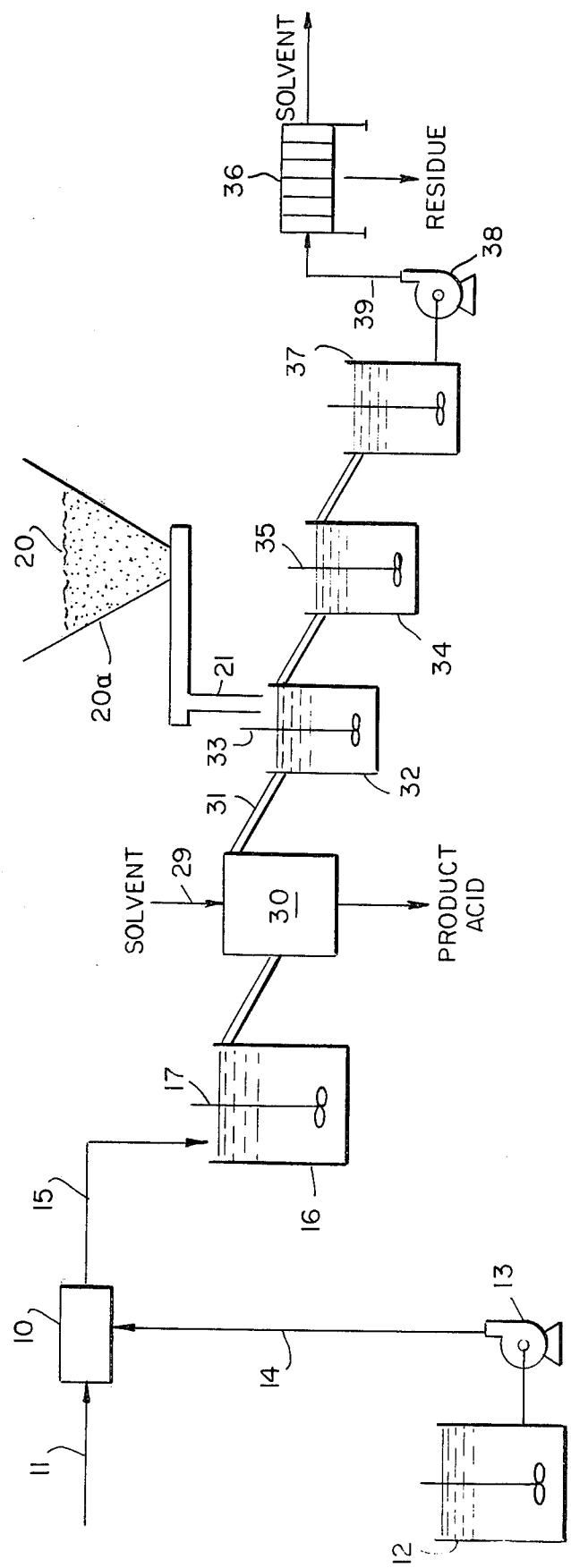

Referring to the FIGS. 1 and 2 of the drawing, a sulfuric acid feed is supplied to a mixer 10 by a pipe line 11 wherein it is combined and blended with a hydrocarbon solution according to the invention. The hydrocarbon solution is supplied to the mixer 10 from vessel 12 via pump 13 and pipe line 14. The mixture leaves the mixer 10 through pipe line 15 and is supplied to tank 16 which functions as a holding and supply vessel. Tank 16 can include a stirring device 17 to prevent separation of the mixture therein.

The sulfuric acid solution supplied to the mixer 10 can be from an acid plant and has an acid concentration of 90% to about 100%, usually either about 93% or about 98% which are the most common commercial grades of sulfuric acid. The sulfuric acid solution typically contains from about 2 to about 20 parts per million (ppm) of elemental mercury, which has been carried over to the acid plant with the sulfur bearing gas feed to the plant from a pyrometallurgical process.

The halogen or halogen compound utilized in the new process should be soluble in the hydrocarbon liquid to the extent necessary to provide a suitable concentration in the hydrocarbon solution or should be soluble in water. The halogen liquid solution prepared in tank 12 typically includes from about 30 grams per liter (g/l) to about 60 g/l of halogen, i.e. $I_2$, $Cl_2$, $Br_2$, etc. or the equivalent amount of compounded halogen may be dissolved in water and mixed with the organic liquid in the proper ratio prior to addition to the acid, or may be added to the acid separately. However, it should be recognized that the concentration of halogen in the hydrocarbon liquid solution is not critical and can vary from 10 g/l or less of molecular halogen to a saturated solution.

In accordance with a specific aspect of the invention, the hydrocarbon liquid component of the solution prepared in vessel 12 is a monohydric lower alcohol chosen from the group having a carbon chain of from 1 to 3 carbon atoms, i.e. methyl, ethyl, propyl and isopropyl alcohols. Although usable according to the invention to form adsorbable complexes with mercury and halogen, longer carbon chain alcohols might break down and cause discoloration of the final acid product, and provide no discernible advantages. Preferably, the alcohol used is methyl alcohol since it is the least expensive of the foregoing group.

The halogen or halogen compound present in the hydrocarbon solution can be a halogen, i.e. chlorine, iodine, fluorine or bromine, or a compound containing a halogen, preferably the alkali metal salts of halogens, i.e. halides. The potassium (K) and sodium (Na) salts of halogens are the preferred halogen containing compounds. According to a specific and preferred aspect of the invention, iodine ($I_2$) and the potassium and sodium salts of chlorine are used to form the hydrocarbon solution.

Pursuant to the invention, the amount of halogen added in the acid solution in vessel 16 is chosen to result in an atomic ratio of the halogen to mercury of at least 1:1, most preferably from 4:1 to 6:1. When halides or other halogen compounds are used, the aforementioned atomic ratio based on the elemental halogen present in the compound is maintained, and the amount of compound needed to result in the desired atomic ratio is determined and used according to the invention.

The amount of hydrocarbon liquid present in the mixture of tank 16 is theoretically chemically sufficient to form the complex with all of the mercury and halogen present. However, excess amounts of hydrocarbon are typically used.

As mentioned previously and although not completely understood at this time, it is believed that the halogen, mercury and hydrocarbon form at least a bi-component chemical complex that is unexpectedly adsorbable on activated carbon and thereby readily removed by filtration. A bi-component complex composed of mercury and halogen is believed to be formed during the new process. It appears that the presence of the hydrocarbon promotes the formation of a complex since in the absence of the hydrocarbon component the halogen and mercury do not form a carbon adsorbable complex and in the absence of the halogen the hydrocarbon and mercury do not form a carbon adsorbable complex. It has further been determined that the mercury alone is not adsorbable on activated carbon. Accordingly, it appears that the invention employs a heretofore unknown synergistic effect resulting in a mercury complex that is readily adsorbable on activated carbon. The mercury complex can be removed by filtration from either that acid, as shown in FIG. 1 or from a solvent containing the complex as shown in FIG. 2 and described hereinafter.

Referring to FIG. 1 of the drawing, the aforementioned mercury complex is formed in the tank 16 and remains in solution. From tank 16, the solution containing the complex is fed to tank 18 through conduit 19. Activated carbon in particulate form 20, from bin 20a is added to the acid solution in tank 18 via supply comduit 21. The activated carbon is thoroughly dispersed throughout the solution by the mixing means 22.

The acid solution including the complex and activated carbon is then conveyed to the tank 23 which also includes a mixer 24. As shown in the drawing, the complex is adsorbed on the activated carbon in both tanks 18 and 23 although the adsorption step might take place in a single tank and mixing step. The retention time of the solution between tank 18 and the filter 25 should be adequate to permit adsorption by the carbon particles of substantially all, i.e. 70% to 90%, of the mercury present. Accordingly, the retention time can vary from several minutes to several hours depending on the type and concentration of ingredients, the operating parameters of the process and the physical characteristics of the apparatus.

The activated carbon and adsorbed complex is removed from the acid solution by filtering means 25. The solution is supplied from a feed tank 26 by pump 27 and pipeline 28. The acid solution leaving the filter 25 is substantially free from mercury contamination, i.e. from about 70 to 90 percent of the mercury originally present in the acid in line 11 has been removed.

Referring now to FIG. 2 of the drawing, the complex containing acid solution is fed from tank 16 through conduit 19 to a continuous liquid-liquid extractor 30. Suitable solvent extraction systems are shown and described in the chapter entitled "Solvent Extraction" beginning on page 714 of the standard reference "Chemical Engineers Handbook," edited by John H. Perry, Third Edition, published by McGraw-Hill Book Company, Inc. A suitable solvent that is immisible with the acid, such as chloroform is supplied to the extractor 30 and product acid free from the mercury complex is withdrawn. The extractor 30 functions to transfer the mercury complex from the acid solution layer to the solvent layer. The mercury complex containing solvent is fed to tank 32 via conduit 31. Activated carbon in particulate form 20, from bin 20a is added to the solvent solution in tank 32 via supply conduit 21. The activated carbon is thoroughly dispersed throughout the solution by the mixing means 33.

The solvent solution including the complex and activated carbon is then conveyed to the tank 34 which also includes a mixer 35. As shown in the drawing, the complex is adsorbed on the activated carbon in both tanks 32 and 34 although the adsorbtion step might take plane in a single tank and mixing step.

The activated carbon and adsorbed complex is removed from the solvent solution by filtering means 36. The solution is supplied from a feed tank 37 by pump 38 and pipeline 39. The solvent solution leaving the filter 36 is substantially free from the mercury complex and may be recycled and reused.

The particle size of the activated carbon 20 used in the method of the invention is not critical and can be from either coarse to very fine, i.e. from 100% passing through sieve number 6 to 100% passing through sieve number 325. All sieve numbers referred to herein are U.S. series. The activated carbon can be derived from lignite or wood. It has been found that a lesser quantity (weight) of activated carbon is required to adsorb the mercury complex when the finer particle sizes are used. The preferred activated carbon used in accordance with the invention is available from ICI U.S.A. Inc., Wilmington, Del., under the trade designation DARCO HDC, which is lignite based and has a particle size such that 70 percent by weight passes through a number 325 sieve.

It has been found that the amount of activated carbon used is not critical and virtually independent of the initial concentration of mercury in the acid. The amount of activated carbon used in the new process can be expressed as a weight percent based on the amount of sulfuric acid treated (93% acid). A lower limit of 0.01% of activated carbon has been determined; the upper limit being a function of cost, although amounts greater than 5% activated carbon are undesirable. The preferred amount of activated carbon is from about 0.02% to about 0.1%.

The invention will be further illustrated by the following specific examples. Unless otherwise specified, the temperature is ambient:

EXAMPLE No. 1

100 ml of concentrated reagent grade sulfuric acid (93%) initially containing varying amounts of added mercury are treated with an equivalent of 2.5 gms of iodine ($I_2$) per gram of Hg initially present in the acid. The iodine was added as a 50 g/l iodine in methyl alcohol solution and the varied amounts of powdered activated carbon were added. The activated carbon was then removed by filtration after a predetermined time and the acid analyzed for mercury. Results were as follows:

| Initial Hg ppm | Atomic Ratio I:Hg | DARCO HDC Carbon Wt % (based on acid) | Final Hg ppm |
|---|---|---|---|
| 3.3 | 4:1 | 2.5 | 0.6 |
| 3.3. | 4:1 | 0.01 | 0.7 |
| 3.8 | 4:1 | 0.02 | 1.5 |
| 14.0 | 4:1 | 0.05 | 0.7 |

Alternatively, the mercury complex can be removed by volatilization at an elevated temperature of from 80° C. to 150° C., preferably about 100° C. Removal of the mercury complex by volatilization eliminates the steps of adsorbing the complex on activated carbon and subsequent filtration. It is, however, an energy and time consuming operation since the acid solution must be heated and the volatilization is a low diffusion process typically requiring 3 to 4 hours with relatively vigorous agitation.

EXAMPLE No. 2

Runs similar to Example No. 1 were made with various alcohols, as follows:

| Initial Hg ppm | Alcohol | Final Hg ppm |
|---|---|---|
| 15.0 | Methanol | 0.7 |
| 15.0 | Ethanol | 0.3 |
| 15.0 | Isopropanol | 0.23 |

EXAMPLE No. 3

Runs were carried out as in Example No. 1 except the halogen additive was varied, as follows:

| Initial Hg ppm | Halogen Additive | Final Hg ppm |
|---|---|---|
| 15.0 | $I_2$ | 0.7 |
| 15.0 | KBr | 0.5 |
| 15.0 | $Br_2$ | 0.3 |
| 15.0 | KCl | 0.5 |
| 15.0 | KF | 4.5 |
| 15.0 | NaF | 4.4 |

The amount of halogen or halogen compound used was determined to result in an atomic ratio of halogen to Hg of about 4:1.

EXAMPLE No. 4

A sample of concentrated sulfuric acid containing 3.3 ppm of mercury was treated with 50 g/l of iodine in methanol in an amount equivalent to 4 atoms of iodine per atom of mercury. The solution was passed through a column of coarse granular activated carbon and the treated acid analyzed for mercury:

Initial Mercury—3.3 ppm
Final Mercury—0.8 ppm

EXAMPLE No. 5

A run similar to Example No. 4 was made except the concentrated acid was heated to 100° C. before treatment:

Initial Hg—3.3. ppm
Final Hg—1.1 ppm

EXAMPLE No. 6

The apparatus shown in FIG. 1 was operated on a continuous basis. The iodine-alcohol solution according to Example 1 was added in Tank 12 and activated carbon to Tank 20a. An acid flow rate of 8 liters/hr. was used in every case and either 1, 2 or 3 of the adsorption tanks 16, 18 and 23 were employed in order to vary the retention time. The data for 4 typical tests and analysis of the filtered solutions are shown in Table I:

TABLE I

| Test No. | Liters Passed | Total Carbon (g) | Total Iodine (g) | Retention Time (Hrs.) | Initial Hg (ppm) | Final Hg (ppm) |
|---|---|---|---|---|---|---|
| 1 | 28.0 | 24.5 | 0.83 | 1.0 | 8.2 | 0.22 |
| 2 | 20.0 | 12.5 | 0.69 | 1.5 | 8.2 | 0.27 |
| 3 | 31.8 | 15.8 | 0.88 | 0.5 | 8.2 | 1.0 |
| 4 | 40.0 | 14.0 | 1.1 | 1.0 | 8.2 | 1.2 |

The following examples 7–11 relate to the application of the invention to various commercial grade sulfuric acid solutions containing mercury. Where a sulfuric acid solution in these examples is identified as being from a smelter, it is meant that the acid was produced from the sulfur dioxide containing gases discharged by that type of smelter.

EXAMPLE No. 7

100 ml of a black, commerical grade sulfuric acid from a lead smelter initially containing 4.4 ppm mercury are treated with an equivalent of 3.75 gms of iodine ($I_2$) per gram of Hg initially present. The iodine was added as a 50 g/l iodine in methyl alcohol solution. Activated carbon in an amount equal of 0.05 percent by weight of the acid was added and then the mercury complex and carbon removed by filtration. The acid was then analyzed for mercury.

Initial Hg—3.75 ppm
Final Hg—0.60 ppm

EXAMPLE No. 8

Runs similar to Example 7 using acids from different sources were made with the following results:

| Acid Source | Initial Hg | Atomic Ratio I:Hg | Final Hg |
|---|---|---|---|
| Lead Smelter (decolorized acid) | 7.0 ppm | 3:1 | 1.2 ppm |
| Zinc Smelter | 10.7 ppm | 6:1 | 0.55 ppm |
| Reagent Grade (Hg added) | 13.7 ppm | 4:1 | 0.60 ppm |
| Zinc Smelter | 10.9 ppm | 4:1 | 0.66 ppm |

EXAMPLE No. 9

100 ml of a commercial grade black acid from a lead smelter containing initially 4.4 ppm mercury was treated with 0.4 ml of an aqueous solution containing 50 g/l KCl and 0.1 ml of methanol. Activated carbon in an amount equal to 0.05% by weight of the acid present was added and, after a predetermined time, filtered. The acid was then analyzed for mercury.

Initial Hg—4.4 ppm
Final Hg—0.3 ppm

EXAMPLE No. 10

100 ml of a commercial grade decolorized acid from a lead smelter containing initially 4.4 ppm mercury was treated with 0.4 ml of an aqueous solution of 50 g/l NaCl and 0.1 ml of methanol. Activated carbon equivalent to 0.05% by weight of the acid present was added and after a predetermined time, filtered. The mercury analysis was as follows:

Initial Hg—4.4 ppm
Final Hg—0.2 ppm

EXAMPLE No. 11

A run similar to that given in Example 10 using identical acid was treated with potassium chloride in the same manner given for sodium chloride. The acid was analyzed for mercury at the conclusion of the run.

Initial Hg—4.4. ppm
Final Hg—0.2 ppm

EXAMPLE No. 12

100 ml of concentrated commercial grade acid containing initially 10.9 ppm mercury are treated by adding 0.151 ml of a 50 g/l $Br_2$ in methanol solution followed by 0.05% by weight of activated carbon. After filtration, the mercury content of the acid was reduced by one-half, i.e. 5.5 ppm Hg.

EXAMPLE No. 13

100 ml of concentrated sulfuric acid containing initially 10.9 ppm mercury was treated by adding 0.101 ml of a 50 g/l $I_2$ in trichloroethylene solution. This represents an atomic ratio of I:Hg of 4:1. Activated carbon equivalent to 0.05% by weight of the acid present was added. After a predetermined time the carbon was filtered off and the acid analyzed for mercury.

Initial Hg—10.9 ppm
Final Hg—1.2 ppm

EXAMPLE No. 14

A run similar to that described in Example 13 was made except that a 50 g/l iodine in methyl ethyl ketone was used in place of the trichloroethylene.

Initial Hg—10.9 ppm
Final Hg—0.8 ppm

EXAMPLE No. 15

100 ml samples of concentrated sulfuric acid were treated with a 50 g/l iodine in methanol solution. Varying atomic ratios of iodine to mercury were used. Actuvated carbon (0.05% by weight) was added and after filtration the acid was analyzed for mercury.

| Initial Hg | Atomic Ratio I:Hg | Final Hg |
|---|---|---|
| 13.7 ppm | 3:1 | 0.7 ppm |

-continued

| Initial<br>Hg | Atomic Ratio<br>I:Hg | Final<br>Hg |
|---|---|---|
| 13.7 ppm | 4:1 | 0.6 ppm |
| 13.7 ppm | 5:1 | 0.7 ppm |
| 13.7 ppm | 6:1 | 0.5 ppm |

EXAMPLE No. 16

100 ml of a concentrated sulfuric acid from a zinc smelter initially containing 280 ppm mercury was treated with an iodine in methanol solution at an atomic ratio of I:Hg of 3.5:1. This was followed by an activated carbon addition of 0.1% by weight of acid present. After filtering of the acid, it was analyzed for mercury.

Initial Hg—280 ppm
Final Hg—0.6 ppm

EXAMPLE No. 17

100 ml of a concentrated sulfuric acid from a zinc smelter initially containing 10.9 ppm mercury are treated by the addition of 0.1 ml of a 50 g/l iodine in methanol solution. Twenty milliliters of chloroform are then added and the mixture shaken in a separatory funnel. The acid layer is removed and then re-extracted with a fresh 20 ml portion of chloroform. This acid now contained 0.3 ppm mercury while the organic layer contained the balance of the mercury removed from the acid. The mercury-iodine complex in the chloroform layer could be removed by two—100 mg additions of activated carbon to the chloroform followed by filtration. After these carbon additions, the chloroform contained less than 0.05 ppm Hg and was colorless, indicating essentially no iodine present.

Although the invention has been described in relation to a specific system, it should be realized that changes and modification can be made without departing from the spirit of the invention. Accordingly, reference should be made to the following claims to determine the scope of the invention.

We claim:

1. A method for removing mercury from a sulfuric acid solution comprising adding to said acid solution both a liquid organic compound soluble in said sulfuric acid and containing chemically bound oxygen and a halogen component chosen from the group consisting of halogens and halides the atomic ratio between said halogen component and said mercury being at least about 1:1, forming a complex that includes said mercury, and removing said complex from said acid solution.

2. The method of claim 1 wherein said halogen component is iodine.

3. The method of claim 1 wherein said organic compound is chosen from the group of mono-hydric organic alcohols having a chain of from 1 to 3 carbon atoms.

4. The method of claim 3 wherein said alcohol is methyl alcohol.

5. The method of claim 1 wherein said halogen component is iodine and said orgamnic compound is chosen from the group consisting of methyl, ethyl, propyl and isopropyl alcohol.

6. The method of claim 5 wherein said halogen is iodine and said alcohol is methyl alcohol.

7. The method of claim 1 wherein said halogen component is chosen from the group consisting of iodides, bromides, chlorides and fluorides.

8. The method of claim 1 wherin said halogen component is chosen from the group consisting of sodium chloride and potassium chloride.

9. The method of claim 1 wherein said organic compound is chosen from the group consisting of alcohols, ketones, esters and organic acids having a molecular carbon content of from 1 to 8 carbon atoms.

10. The method of claim 1 wherein said removing step includes adding to said acid solution subsequent to said forming step particulate activated carbon, adsorbing said complex onto said activated carbon and filtering said activated carbon and adsorbed complex from said acid solution.

11. The method of claim 10 wherein the amount of activated carbon added is from 0.01% to about 5% based on the weight of sulfuric acid treated.

12. The method of claim 1 wherein said complex is removed from said acid solution by liquid-liquid solvent extraction.

13. A method for removing mercury from a sulfuric said solution comprising adding to said acid solution a hydrocarbon liquid solution comprising an organic liquid and a halogen component, said organic liquid being soluble in said acid solution and chosen from the group consisting of alcohols, ketones, esters and acids having a molecular carbon content from 1 to 8 carbon atoms, said halogen component chosen from the group consisting of halogens and halides, the atomic ratio between said halogen is said organic liquid solution and mercury in said acid solution being at least about 1:1, mixing said acid solution and said hydrocarbon liquid solution, adding particulate activated carton to said acid solution subsequent to said mixing step, dispersing said activated carbon, and filtering said activated carbon from said acid solution.

14. The method of claim 13 wherein said atomic ratio is from about 2:1 to about 6:1.

15. The method of claim 13 wherein the amount of activated carbon added is at least 0.01% based on the weight of sulfuric acid treated.

16. The method of claim 13 wherein said hydrocarbon liquid solution contains at least 10 grams per liter of molecular halogen or the equivalent thereof.

* * * * *